US011867078B2

(12) United States Patent
Li et al.

(10) Patent No.: US 11,867,078 B2
(45) Date of Patent: Jan. 9, 2024

(54) TURBINE WHEEL

(71) Applicant: Garrett Transportation I Inc., Torrance, CA (US)

(72) Inventors: Penny Li, Shanghai (CN); Annie Li, Shanghai (CN); Daniel Wood, Torrance, CA (US)

(73) Assignee: Garrett Transportation I Inc., Torrance, CA (US)

(*) Notice: Subject to any disclaimer, the term of this patent is extended or adjusted under 35 U.S.C. 154(b) by 0 days.

(21) Appl. No.: 17/838,179

(22) Filed: Jun. 11, 2022

(65) Prior Publication Data

US 2023/0399950 A1    Dec. 14, 2023

(51) Int. Cl.
| | | |
|---|---|---|
| *F01D 5/04* | (2006.01) | |
| *H01M 8/04111* | (2016.01) | |
| *F02C 6/12* | (2006.01) | |
| *F01D 5/14* | (2006.01) | |

(52) U.S. Cl.
CPC ............. *F01D 5/048* (2013.01); *F01D 5/141* (2013.01); *F02C 6/12* (2013.01); *H01M 8/04111* (2013.01); *F05D 2220/40* (2013.01); *F05D 2240/303* (2013.01); *F05D 2240/304* (2013.01); *F05D 2250/38* (2013.01);
(Continued)

(58) Field of Classification Search
CPC ............ F01D 5/048; F01D 5/141; F02C 6/12; H01M 8/04111; F05D 2220/40; F05D 2240/303; F05D 2240/304; F05D 2250/38; F05D 2250/711; F05D 2250/712; F05D 2250/75
See application file for complete search history.

(56) References Cited

U.S. PATENT DOCUMENTS 6,588,485 B1 * 7/2003 Decker .................. F04D 29/30
                                                           164/113
6,754,954 B1 * 6/2004 Decker .................. B21K 3/04
                                                           29/889
(Continued)

FOREIGN PATENT DOCUMENTS

CN          104854325 A         8/2015

OTHER PUBLICATIONS

Luddecke et al., On Mixed Flow Turbines for Automotive Turbocharger Applications, International Journal of Rotating Machinery, vol. 2012, Article ID 589720 (15 pages).
(Continued)

*Primary Examiner* — Brian Christopher Delrue
(74) *Attorney, Agent, or Firm* — Brian J. Pangrle

(57) ABSTRACT

A turbocharger turbine wheel can include a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a leading edge and a trailing edge, where the leading edge includes a lower axial point defined by a first theta angle and an upper axial point defined by a second theta angle, where the first theta angle is greater than the second theta angle with respect to the direction of intended rotation of the turbine wheel.

15 Claims, 14 Drawing Sheets

(52) U.S. Cl.
CPC .. *F05D 2250/711* (2013.01); *F05D 2250/712* (2013.01); *F05D 2250/75* (2013.01)

(56) References Cited

U.S. PATENT DOCUMENTS

| | | | |
|---|---|---|---|
| 8,096,777 B2* | 1/2012 | Yokoyama | F01D 1/08 |
| | | | 416/243 |
| 9,709,068 B2 | 7/2017 | Thompson et al. | |
| 10,774,676 B2* | 9/2020 | Hu | F01D 17/165 |
| 2009/0104023 A1* | 4/2009 | Favray | F02C 6/12 |
| | | | 415/208.2 |
| 2010/0098548 A1* | 4/2010 | Yokoyama | F01D 5/048 |
| | | | 416/223 R |
| 2015/0086396 A1* | 3/2015 | Nasir | F01D 5/141 |
| | | | 417/407 |
| 2015/0330226 A1 | 11/2015 | Yokoyama et al. | |
| 2016/0218383 A1* | 7/2016 | Hanschke | H01M 8/04111 |
| 2019/0040743 A1* | 2/2019 | Yoshida | F01D 5/14 |
| 2019/0145416 A1 | 5/2019 | Donato et al. | |
| 2020/0355111 A1* | 11/2020 | Lusardi | F02B 37/24 |

OTHER PUBLICATIONS

EP Application No. 23172240.6—1004 Extended European Search Report, dated Nov. 24, 2023 (8 pages).

\* cited by examiner

US 11,867,078 B2

TURBINE WHEEL

TECHNICAL FIELD

Subject matter disclosed herein relates generally to turbine wheels that can be utilized by fuel cell systems or other systems.

BACKGROUND

Fuel cell systems often include a charging device (e.g., a compressor system that can include a compressor wheel and a turbine wheel) for compressing air before it is fed to the fuel cell stack. This can increase operating efficiency of the fuel cell system. However, conventional charging devices suffer from various deficiencies such that operating efficiency of the fuel cell system may suffer as a result. Thus, it is desirable to provide a compressor system that improves efficiency of the fuel cell system.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
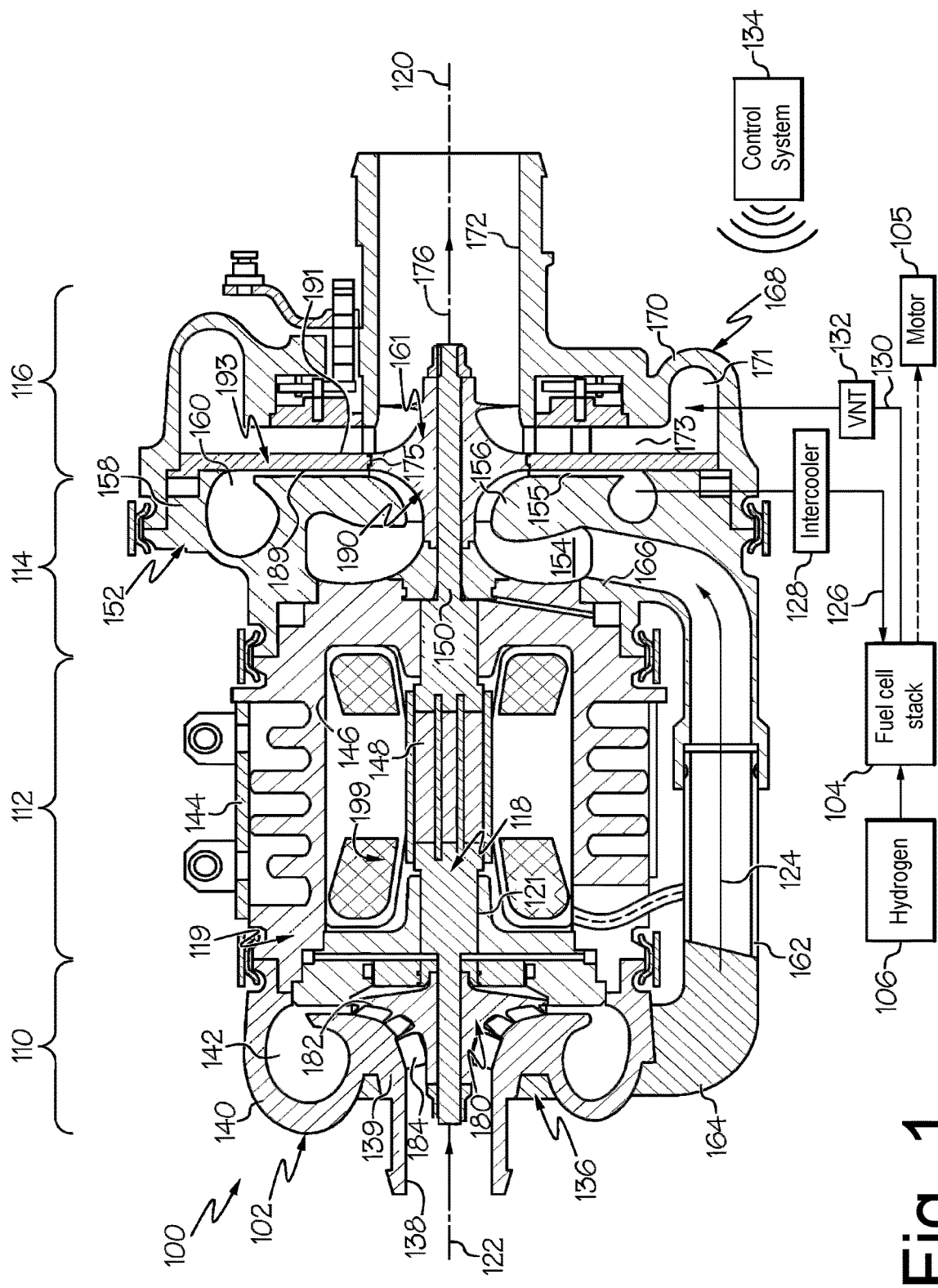
FIG. 1 is a cross-sectional, cutaway view of an example of a charging device.

FIG. 1 is a schematic view of a fuel cell system 100 with an example charging device 102. In some embodiments, the fuel cell system 100 may be included in a vehicle, such as a car, truck, sport utility vehicle, van, motorcycle, etc. However, it will be appreciated that the fuel cell system 100 may be configured for one or more different uses.

The fuel cell system 100 may include a fuel cell stack 104 that includes a plurality of fuel cells. Hydrogen may be supplied to the fuel cell stack 104 from a tank 106, and oxygen may be supplied to the fuel cell stack 104 to generate electricity via chemical reaction. The fuel cell stack 104 may generate electricity for an electrical device, such as an electric motor 105. As mentioned, the fuel cell system 100 may be included in a vehicle; therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by operation of the charging device 102 with respect to intake air. As will be discussed, the charging device 102 may compress air as it flows toward the fuel cell stack 104 for boosting the operating efficiency of the fuel cell system 100.

The charging device 102 may be configured as a multi-stage fuel cell compressor. As shown in FIG. 1, the charging device 102 may generally include a rotating group 118 and a housing 119. The rotating group 118 may include a shaft 150 and various other components that are fixedly supported on the shaft 150 for rotation within the housing 119 by a bearing 121, such as a plain bearing, an air bearing, and/or an oil-less bearing.

The rotating group 118 and the housing 119 may cooperate to define a first compressor stage 110, a motor section 112, a second compressor stage 114, and a turbine section 116 of the charging device 102. In some embodiments, the first compressor stage 110 may be referred to as a low pressure compressor stage and the second compressor stage 114 may be referred to as a high pressure compressor stage. The motor section 112 may include a motor 199 that includes a stator 146 and a rotor 148 and that drives and rotates the rotating group 118 about an axis 120. Accordingly, an inlet airstream (represented by arrow 122) may be compressed by the first compressor stage 110 (a low pressure compressor stage). A low pressure airstream (represented by arrow 124) may be directed to the second compressor stage 114 (a high pressure compressor stage) for further compression. A high pressure airstream (represented by arrow 126) from the second compressor stage 114 may be directed to an intercooler 128 and then to the fuel cell stack 104. Accordingly, the stack 104 may generate electricity from the hydrogen provided from the tank 106 and the oxygen provided in the high pressure airstream 126. While two stages are shown, a charging device may include a single stage or more than two stages.

As shown in the example of FIG. 1, an exhaust gas stream (represented by arrow 130) from the fuel cell stack 104 can be directed back to the turbine section 116 of the charging device 102. The exhaust gas stream 130 may drive and rotate the rotating group 118 at the turbine section 116 to assist the motor section 112. In some embodiments, the exhaust gas stream 130 may be directed toward the turbine section 116 by a variable nozzle device 132 such as a variable nozzle turbine (VNT).

Various components of the fuel cell system 100 may be controlled by a control system 134. The control system 134 may be a computerized system with a processor, memory, various sensors, and other components for electrically controlling operation of the fuel cell stack 104, the motor section 112, the motor 105, the variable nozzle device 132, and/or other features of the system 100. In some embodiments, the control system 134 may define or may be part of the electrical control unit (ECU) of a vehicle.

A multi-stage compressor of the charging device 102 can allow for higher pressure ratios during operation. Also, the turbine section 116 provides energy recovery for the charging device 102.

The turbine section 116 may be disposed in close proximity to at least one of one or more compressor stages. For example, one or more components of the turbine section 116 may be disposed in a back-to-back arrangement with components of the second compressor stage 114 or, for example, the turbine section 116 may be disposed in a back-to-back arrangement with components of the first compressor stage 110.

As shown in the example of FIG. 1, the housing 119 may include a motor housing 144 that is hollow and cylindrical. The motor housing 144 may extend lengthwise along the axis 120, between the first compressor stage 110 and the second compressor stage 114. The motor housing 144 may house the stator 146, which may be fixed inside the motor housing 144. The rotor 148 may be fixed on the shaft 150 of the rotating group 118 and may be received within the stator 146.

As shown in the example of FIG. 1, the housing 119 may include a first compressor housing member 136, which defines an axial inlet 138, a shroud member 139, and a volute member 140. The volute member 140 may be fixedly attached on one end of the motor housing 144 or other portions of the motor section 112. The axial inlet 138 may be straight and centered on the axis 120. The shroud member 139 may be inversely shaped according to components of the rotating group 118. The volute member 140 may define a volute passage 142 therein that extends about the axis 120. The inlet airstream 122 may flow into the inlet 138, flow past the shroud member 139, and flow into the volute passage 142 during operation of the charging device 102.

As shown in the example of FIG. 1, the housing 119 may include a second compressor housing member 152, which defines a radial inlet 154, a shroud member 156, and a volute member 158. The second compressor housing member 152 may be fixedly attached to the motor housing 144 or other portions of the motor section 112, on an opposite end from the first compressor housing member 136. The radial inlet 154 may extend in a downstream direction radially toward the axis 120 and may become gradually smaller in cross sectional area. The inlet 154 may also turn in a direction that is substantially parallel to the axis 120 and may fluidly connect to a diffuser section 155. The shroud member 156 may be contoured and shaped according to components of the rotating group 118. The volute member 158 may define a volute passage 160 therein that extends about the axis 120. The low pressure airstream 124 may flow into the inlet 154, flow past the shroud member 156, and flow into the volute passage 160. From the volute passage 160, the high pressure airstream 126 may flow to the intercooler 128 and, then, to the fuel cell stack 104.

In some embodiments, the charging device 102 may also include an interstage duct 162. The interstage duct 162 may be elongate with a first end 164 that is connected to the volute member 140 of the first compressor stage 110 and a second end 166 that is connected to the radial inlet 154 of the second compressor stage 114. In such an approach, the interstage duct 162 may direct flow of the low pressure airstream 124 from the first compressor stage 110, across the motor housing 144, and to the second compressor stage 114.

As mentioned, the housing 119 of the charging device 102 can include a turbine housing member 168. The turbine housing member 168 may be fixed to the second compressor housing member 152 on an end that is opposite the motor section 112. The turbine housing member 168 may define a volute inlet member 170 with a circumferential passage 171 and a radial passage 173 formed therein. The circumferential passage 171 may receive the exhaust stream 130 from the fuel cell stack 104, and the circumferential passage 171 may direct the stream radially inward along the radial passage 173 toward an axial outlet 172 of the turbine housing member 168. In such an approach, the rotating group 118 may be driven in rotation by the exhaust stream 130 at the turbine section 116. A resultant exhaust stream 176 may exit the charging device 102 via the axial outlet 172.

In some embodiments, the housing 119 may further include a divider member 193. The divider member 193 may be a relatively flat plate with a first surface 191 and an opposing second surface 189. The divider member 193 may separate the turbine section 116 and the second compressor stage 114. In other words, the divider member 193 may define a boundary for both the turbine section 116 and the second compressor stage 114. In some embodiments, the divider member 193 may be fixed and sandwiched between the turbine housing member 168 and the second compressor housing member 152. Also, the first surface 191 may define a portion of the radial passage 173 and the circumferential passage 171 of the turbine section 116. Furthermore, the second surface 189 may define a portion of diffuser section 155 and the volute passage 160.

The housing 119 and/or other portions of the charging device 102 may include a number of additional components. For example, the housing 119 may include a number of fasteners, fluid seals, heat shields, and/or other components for maintaining efficient and effective operations of the charging device 102.

As shown in the example of FIG. 1, the rotating group 118 can include at least one compressor wheel 180 (e.g., as a first compressor wheel). The compressor wheel 180 may include a support structure 182 and a plurality of blades 184. The blades 184 may be relatively thin members that project from the support structure 182. The blades 184 may project radially away from the axis 120. The blades 184 may also extend helically about the axis 120. The compressor wheel 180 may be fixed to one terminal end of the shaft 150, in the first compressor stage 110, with a second end and the blades 184 facing in the upstream direction of the axial inlet 138. The compressor wheel 180 may be substantially centered on the axis 120. Also, as shown in FIG. 1, the compressor wheel 180 and the shroud member 139 may cooperate to at least partly define the first compressor stage 110. Thus, during operation of the charging device 102, the compressor wheel 180 may rotate relative to the shroud member 139, compressing the inlet airstream 122 and moving the low pressure airstream 124 toward the second compressor stage 114 via the interstage duct 162.

Where multiple stages are provided, the second compressor wheel 190 may include a support structure and a plurality of blades. The support structure and the blades may share one or more common features with the support structure 182 and blades 184, respectively, of the compressor wheel 180 as discussed. However, the support structure and blades may have different sizes, dimensions, arrangements, etc. As shown, the support structure may include a first end and a second end that are spaced apart along the axis 120. The support structure may gradually taper outward radially along the axis 120 from the smaller second end to the larger first end. The blades may extend radially from the axis 120 and may extend helically with respect to the axis 120.

The inlet spacer and the second compressor wheel 190 may be fixed to the shaft 150 in the second compressor stage 114. The second compressor wheel 190 may be fixed to the shaft 150 with the second end disposed between the motor section 112 and the first end. Also, in this position, the second compressor wheel 190 may be oriented with the blades facing generally toward the motor section 112 and the compressor wheel 180. The second compressor wheel 190 may be substantially centered on the axis 120. Also, the second compressor wheel 190 and the shroud member 156 may cooperate to at least partly define the second compressor stage 114. Thus, during operation of the charging device 102, the inlet spacer and the second compressor wheel 190 may rotate relative to the shroud member 156. The inlet spacer may direct the airstream 124 toward the second compressor wheel 190, and the second compressor wheel 190 may compress the airstream 124 and move the high pressure airstream 126 toward the fuel cell stack 104.

As mentioned, the rotating group 118 can include a turbine wheel 161. The turbine wheel 161 may include a support structure and a plurality of blades. As shown, the support structure can include a first end and a second end that are spaced apart along the axis 120. The support structure may gradually taper outward radially along the axis 120 from the smaller second end to the larger first end. The blades may extend radially from the axis 120 and may extend helically and/or in another manner with respect to the axis 120.

A support structure of a turbine wheel may be directly fixedly attached to a support structure of a compressor wheel or a support structure of a turbine wheel may be indirectly attached, for example, via a shaft. As explained, a turbine wheel and one or more compressor wheels may be operatively coupled to a shaft, which may be a single unitary shaft or a multi-piece shaft. As an example, a turbine wheel may be oriented with its blades generally facing in an opposite direction and away from blades of a compressor wheel and/or a turbine wheel may be oriented with its blades generating facing in a common direction with blades of a compressor wheel. A turbine wheel may be disposed in close proximity and, in some embodiments, immediately adjacent to an end of a compressor wheel, which may be a first stage or a second stage compressor wheel. As an example, a turbine wheel may be disposed next to a compressor wheel in a back-to-back arrangement or another arrangement.

As an example, a compressor wheel and a turbine wheel may be integrally attached so as to be a monolithic, unitary, and one-piece member. In some embodiments, the turbine wheel 161 and the second compressor wheel 190 may be formed simultaneously and integrally attached together. For example, a one-piece member may be formed via a casting process, via an additive manufacturing (3-D printing) process, or another suitable process.

As explained, a turbine wheel and a compressor wheel may be separate and independent pieces. In some embodiments, the turbine wheel 161 and second compressor wheel 190, if provided (e.g., in a multistage charging device), may be removably attached to each other and/or to the shaft 150 such that these parts may be detached, for example, for repair and replacement. As an example, the turbine wheel 161 and second compressor wheel 190 may abuttingly contact each other, or there may be a gap defined between the second compressor wheel 190 and the turbine wheel 161.

The turbine wheel 161 may be disposed within the turbine housing member 168 to define the turbine section 116 of the charging device 102. Also, the second compressor wheel 190 may be disposed within the second compressor housing member 152. The second compressor wheel 190 may be interposed between the turbine wheel 161 and the compressor wheel 180 with respect to the axis 120. Furthermore, the rotor 148 may be interposed between the second compressor wheel 190 and the compressor wheel 180. The blades of the second compressor wheel 190 may face toward the first side 186 of the first compressor wheel 180. Also, the blades of the turbine wheel 161 may face downstream into the axial outlet 172.

The circumferential passage 171 (e.g., scroll or volute) and the radial passage 173 of the turbine section 116 may receive the exhaust stream 130 from the fuel cell stack 104. The turbine wheel 161 may be driven in rotation by the exhaust stream 130 to assist the motor 199 in rotating the shaft 150. The exhaust stream 176 may exit the charging device 102 via the axial outlet 172.

A turbine wheel may be part of an assembly such that the turbine wheel is part of a turbine expander (e.g., a turbo-expander, an expansion turbine, etc.). For example, the turbine wheel 161 may expand the gas of the exhaust stream 130 to produce work for assisting the motor 199 in driving one or more compressor stages (e.g., the compressor stages 110 and 114 in a multistage charging device).

Efficiency of a turbine section may be increased with higher temperatures in areas proximate a turbine wheel. Also, by comparison, temperatures proximate a turbine wheel may be substantially lower than adjacent areas of a charging device. Thus, in some embodiments, the turbine wheel 161 may absorb heat from the adjacent areas of the charging device 102. For example, the turbine wheel 161, the inlet into the turbine section 116, etc., may absorb heat from the second compressor wheel 190, the shroud member 156, and/or the volute member 158 of the second compressor stage 114. Thus, temperatures proximate the turbine wheel 161 may be increased for improved efficiency of the turbine section 116. Also, temperatures proximate the second compressor wheel 190 may be reduced, which may allow a lighter-duty intercooler 128 to be used.

The charging device 102 may provide improved operating efficiency for the fuel cell system 100. The charging device 102 may also be relatively compact. As an example, a back-to-back arrangement of the second compressor wheel 190 and the turbine wheel 161 may reduce the amount of overhanging mass on the rotating group 118. This may improve dynamic performance of the rotating group 118 and enable subcritical operation. In such an approach, the rotating group 118 may be simpler to balance, and noise may be reduced. These factors may also contribute to a smaller package size and reductions in overall costs for the fuel cell system 100; again, noting that a charging device may be a single stage charging device.

Figure 2:
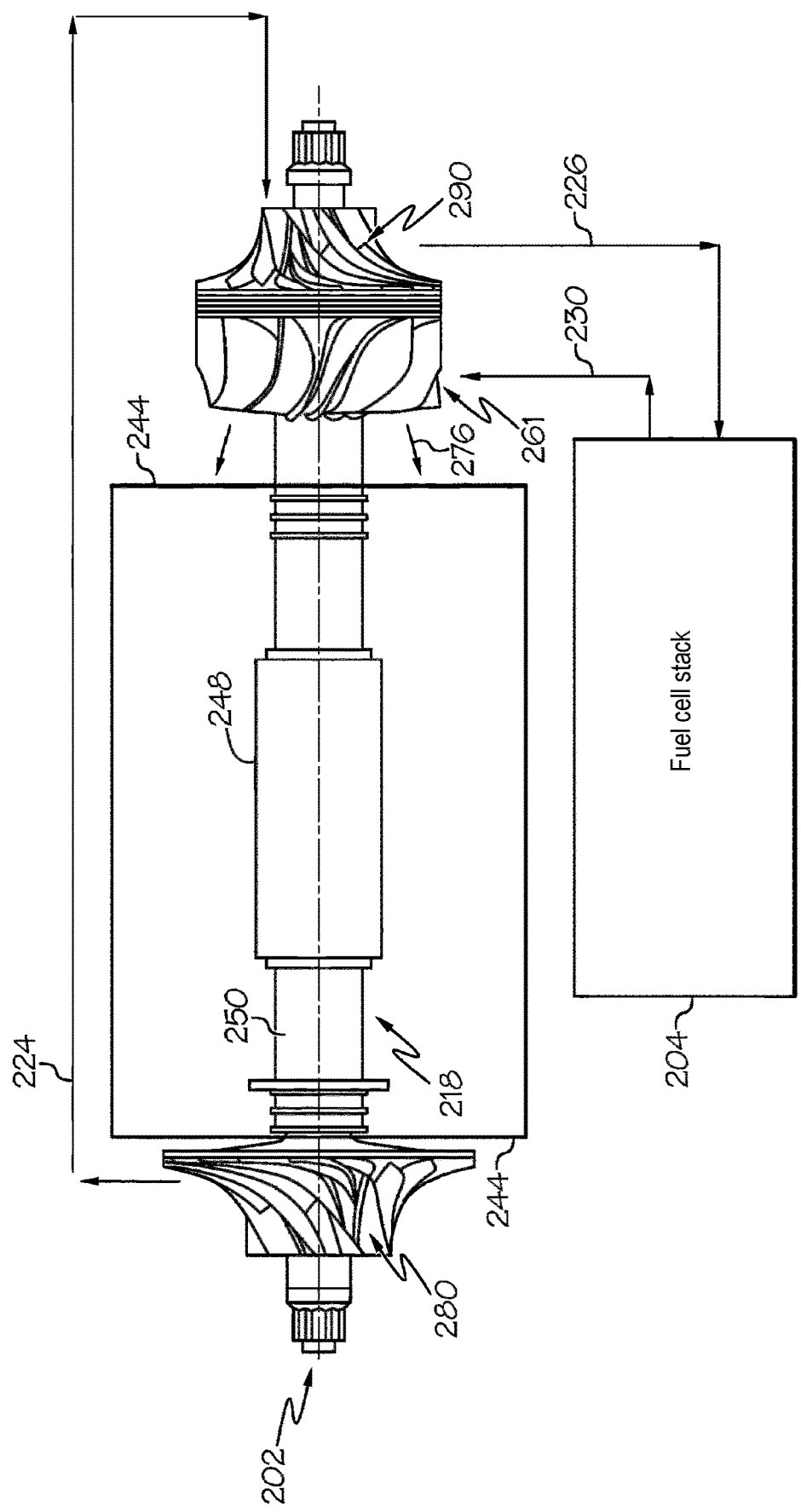
FIG. 2 is a side view of an example of a rotating assembly of a charging device.

FIG. 2 shows an example of components of a charging device 202, which can include various features of the charging device 102. As shown, the charging device 202 include a rotating group 218 with a shaft 250, a first compressor wheel 280, a rotor 248, a second compressor wheel 290, and a turbine wheel 261. The turbine wheel 261 and the second compressor wheel 290 may be disposed in a back-to-back arrangement. As shown in FIG. 2, the turbine wheel 261 may be disposed between the first compressor wheel 280 and the second compressor wheel 290 along an axis 220; again, noting that a charging device may be a single stage charging device (e.g., a charging device may include one or more compressor wheels).

In operation, a low pressure airstream 224 may flow (through an interstage duct) to the second compressor wheel 290. A high pressure airstream 226 may flow from the second compressor wheel 290 to a fuel cell stack 204. An exhaust gas stream 230 may then flow to the turbine wheel 261 to drive the turbine wheel 261 in rotation. Next, an exhaust stream 276 may flow axially toward a motor housing 244 and then out of the charging device 202.

An orientation of a back-to-back turbine wheel/compressor wheel may be configured according to various considerations. For example, one orientation may provide better balancing of thrust forces along an axis of a shaft of a rotating group. Such an approach may reduce loads on one or more bearings. As explained, an orientation may be more compact and/or may provide better packaging, ducting, etc.

Figure 3:
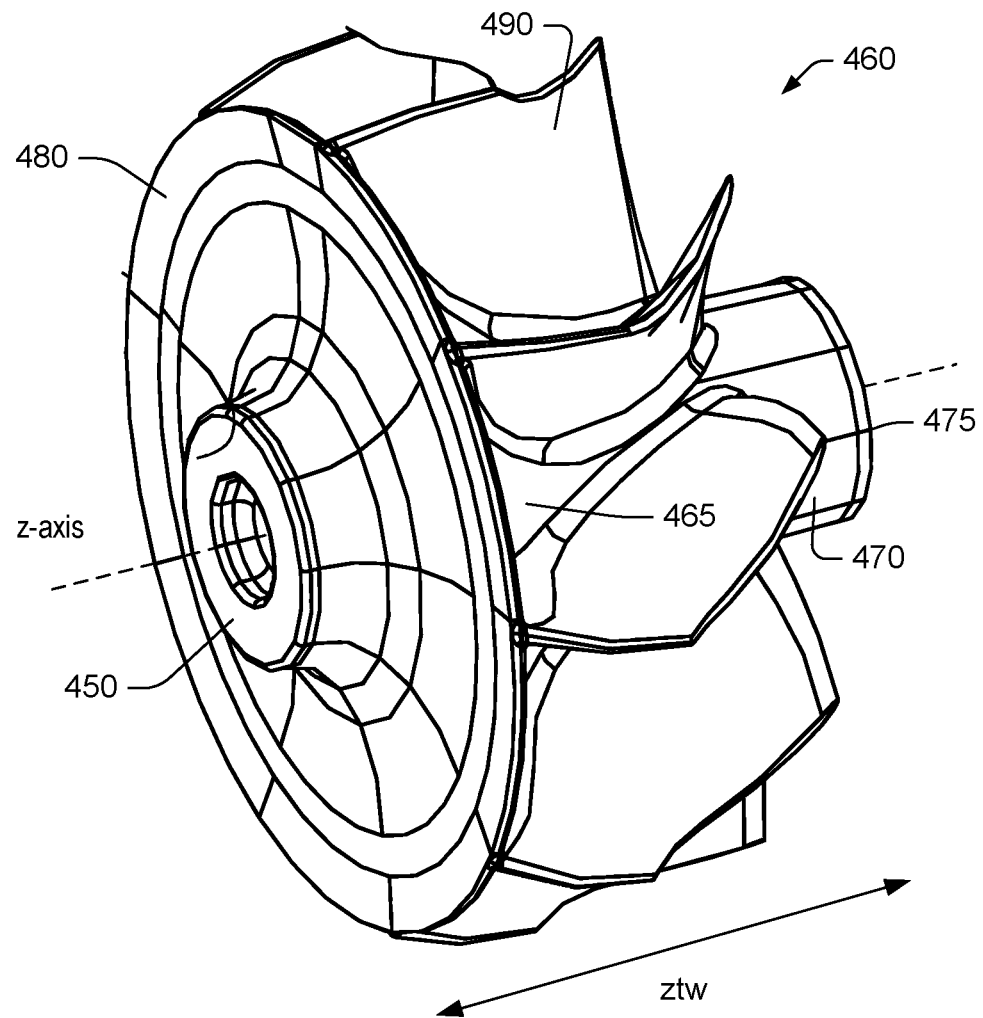
FIG. 3 is a perspective view of an example of a turbine wheel.

FIG. 3 shows a perspective view of a turbine wheel 460 that includes a nose 470, a backdisk 480 and blades 490. The turbine wheel 460 can be a single, unitary piece of material and referred to as a single component or a single piece. A portion of the turbine wheel 460 can be referred to as a hub 465. For example, the backdisk 480 can be a part of the hub 465 from which the blades 490 extend. The hub 465 can include the backdisk 480 and the nose 470 and extend the length of the turbine wheel as indicated by an axial length ztw as measured along a rotational z-axis of the turbine wheel 460.

As shown in FIG. 3, the turbine wheel 460 can include a shoulder or step down from the turbine wheel 460 toward a shaft. For example, a shoulder can step down from an outer surface of a joint portion 450. The joint portion 450 can include a surface that is an annular axial face that can form a portion of a shoulder.

As an example, the joint portion 450 can include a joint surface that can be defined in part by a joint radius. For example, consider a joint surface that can be utilized to position a turbine wheel with respect to another component. In such an example, the joint surface of the turbine wheel can be a mating surface that mates with another component where two surfaces may be brought into proximity or direct contact. As an example, a joint surface may be an annular surface.

As an example, a turbine wheel may be defined using diameters, which can be circles that inscribe features of the turbine wheel. For example, where a turbine wheel includes an odd number of blades, a diameter as a line may not be drawn from a leading edge of one blade to a leading edge of another blade. In such an example, diameter can be defined via a circle that inscribes the leading edges of the blades or, for example, mathematically, as twice a radius. A turbine wheel may be defined by an inducer diameter (e.g., associated with exhaust inflow) and an exducer diameter (e.g., associated with exhaust outflow). As an example, an inducer diameter can exceed an exducer diameter. As an example, a trim of a turbine wheel can be defined using its inducer diameter and its exducer diameter. Where diameter is mentioned, it may refer to a diameter of a circle that can be drawn with respect to features of a turbine wheel. As an example, a turbine wheel may be defined in a cylindrical coordinate system that includes axial, radial and azimuthal coordinates (e.g., r, z, and Θ).

As an example, a balancing process may alter one or more dimensions of a turbine wheel, for example, via removal of material. For example, consider removal of material from the nose 470 of the turbine wheel 460. As shown, the nose 470 has an outer diameter that is less than an outer diameter of the backdisk 480. Another option can be to remove material from the backdisk 480. As an example, material may be removed from the joint portion 450. In such an example, material removal may have minimal impact on the backdisk 480 as to its ability to support the blades 490.

Figure 4:
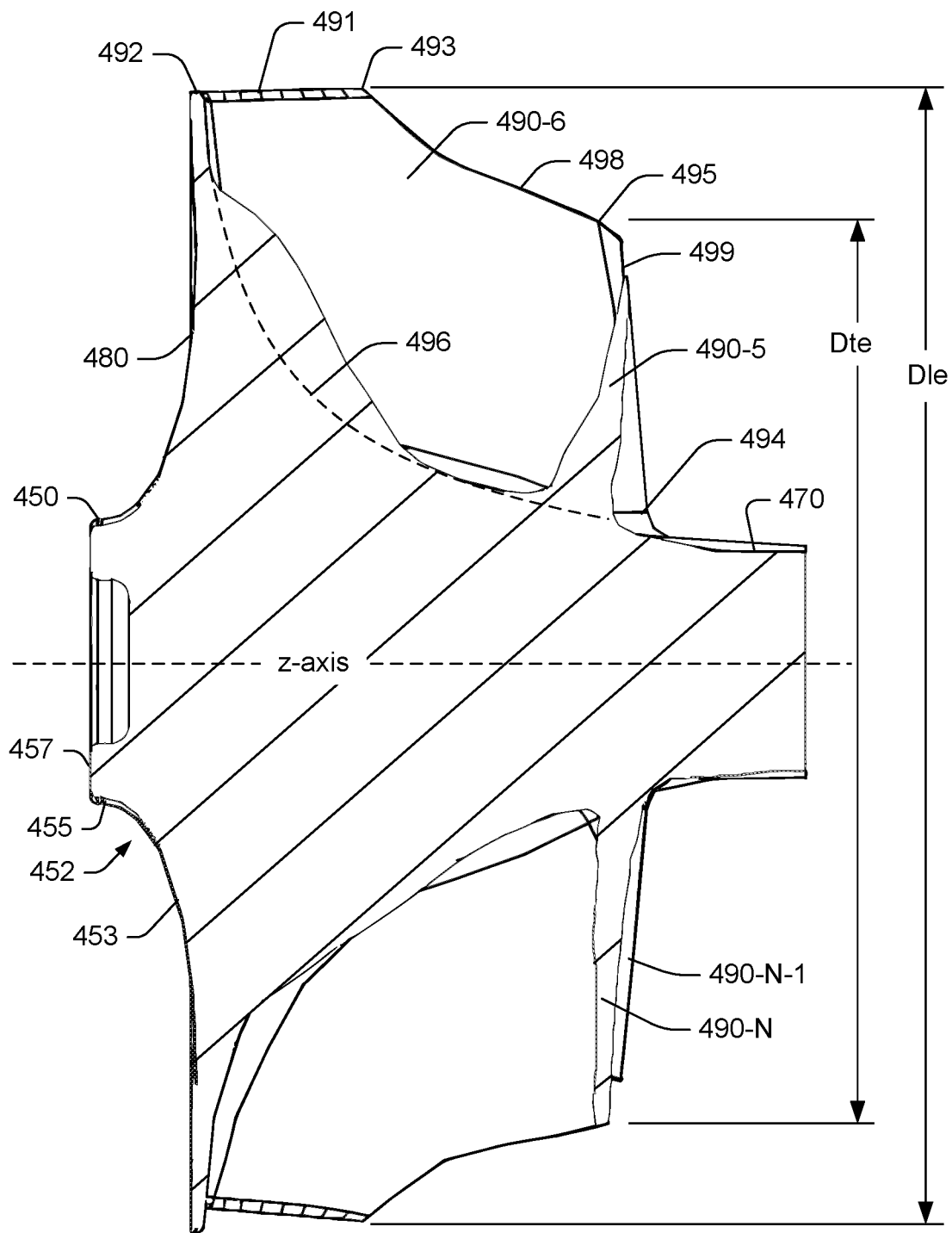
FIG. 4 is a cross-sectional, cutaway view of an example of a turbine wheel.

As shown in the example of FIG. 4, the turbine wheel 460 can include the hub 465 that includes the nose 470, the backdisk 480, a joint portion 450 (e.g., as part of the backdisk 480) and a rotational axis (z-axis); the blades 490 that extend from the hub 465 to define flow channels where each of the blades 490 includes a leading edge, a trailing edge, a hub profile, a shroud profile, a pressure side, and a suction side; where the backdisk 480 includes an outer perimeter radius measured from the rotational axis of the hub 465 and an intermediate radius at an outer perimeter of the joint portion 450 measured from the rotational axis of the hub 465.

As to the joint portion 450, it is shown as being substantially cylindrical. As an example, the backdisk 480 can be defined as a lower portion of the hub 465 that includes at least part of the joint portion 450 and that extends outwardly to a maximum outer perimeter of the backdisk 480.

As an example, a shaft may be made of a material that is the same as that of a turbine wheel or that is different from that of a turbine wheel. As mentioned, a compressor wheel may be manufactured from a material that has a lesser specific gravity than a material of a turbine wheel. As an example, a turbine wheel can be made of a nickel alloy. For example, consider a NiCrFe-based alloy (e.g., HASTALLOY material, INCONEL material, etc.) or another alloy. As an example, a compressor wheel may be made of a lighter material such as, for example, aluminum or an aluminum alloy. A turbine wheel material may have a specific gravity that is double or more than double that of aluminum (approximately 2.7 versus approximately 8.4 for INCONEL 625 material). A rotating assembly can have a mass defined by a sum of individual masses of components that make up the rotating assembly. As mentioned, flow to a turbine wheel disposed in a turbine housing can be a driver for rotation of a rotating assembly where mass and other factors can determine how much exhaust must flow before rotation commences.

FIG. 4 shows the example turbine wheel 460 in a cross-sectional, cutaway view. FIG. 4 shows the joint portion 450 with a shoulder 452 and surfaces 453, 455 and 457. As shown, the surface 457 can be a surface that is a mating surface for joining of the turbine wheel 460 to another component.

As shown in the example of FIG. 4, the turbine wheel 460 includes various blade features such as a leading edge 491 (or inducer edge), a trailing edge 499 (or an exducer edge), a backdisk point 492 of the leading edge 491, a tip point 493 of the leading edge 491, a hub point 494 of the trailing edge 499 and a tip point 495 of the trailing edge 499. As shown, the turbine wheel 460 has a blade outer diameter at the tip point 493 of the leading edge 491 (e.g., inducer edge); another blade outer diameter at the tip point 495 of the trailing edge 499 (e.g., exducer edge); and a blade diameter at the hub point 494 at the trailing edge 499 (e.g., exducer edge).

As mentioned, a circle may inscribe blade features to define a diameter. In FIG. 4, the diameters Dle (diameter leading edge) and Dte (diameter trailing edge) are not shown as corresponding to circles but rather as corresponding to the particular cross-section, where a circle would have a slightly larger diameter than Dle and another circle would have a slightly larger diameter than Dte.

As shown in the example of FIG. 4, a dashed line represents a hub profile 496 of the blade 490-5 while a solid line 498 represents at least a portion of a shroud profile of the blade 490-5.

Figure 5:
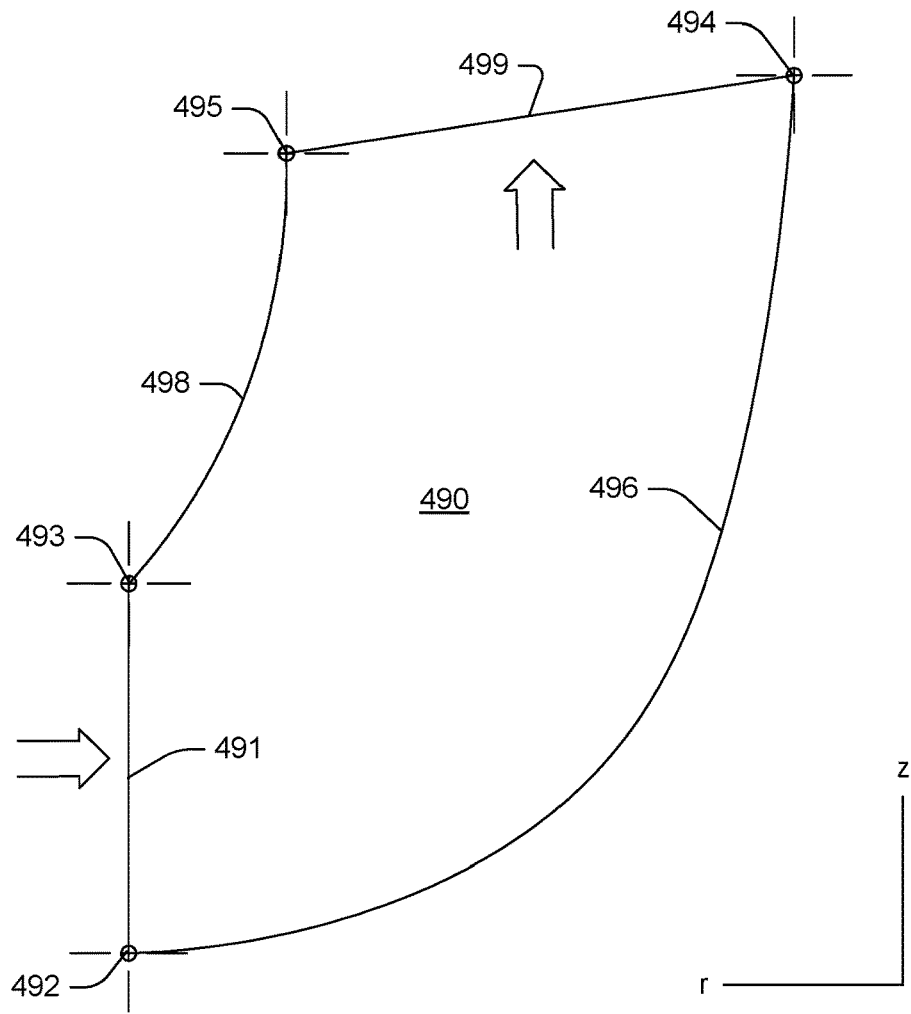
FIG. 5 is a projected view of an example of a blade of a turbine wheel with a radial inflow leading edge and a projected view of an example of a blade of a turbine wheel with a mixed-flow inflow leading edge.
Figure 5:
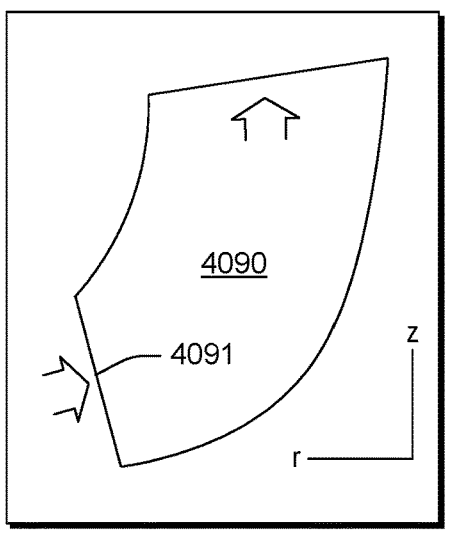

FIG. 5 shows a plan view of an example of the blade 490, along with various points and profiles described with respect to FIG. 4. FIG. 5 also shows arrows that indicate intended direction of flow, from the leading edge 491 to the trailing edge 499 where two adjacent blades define a flow channel for flow. As mentioned, one side of a blade can be defined as a pressure side (PS) while an opposing side of the blade can be defined as a suction side (SS). The plan view of FIG. 5 is a projected view such that the concave and convex shapes of the blade 490 are not seen. In FIG. 5, the blade 490 can be defined with respect to radial and axial coordinates. As an example, a polar angle plot may be utilized to provide for additional information that defines the blade 490. For example, consider a plot of wrap angle along a camber line. As an example, the blade 490 may be defined using one or more equations, parameters, etc., of an airfoil or an impeller.

As an example, a turbine wheel can be a radial flow turbine wheel (e.g., radial inlet flow) or can be a mixed-flow turbine wheel (e.g., mixed inlet flow) where an angle can define at least a portion of a leading edge such that incoming exhaust has both a radial component and an axial component. FIG. 5 shows an example of a mixed-flow turbine wheel blade 4090 where a leading edge 4091 is at an angle other than 90 degrees with respect to the r-axis and is at an angle other than 0 degrees with respect to the z-axis (e.g., approximately 1 degree to approximately 89 degrees). As an example, a turbine wheel blade may be radially stacked or not radially stacked (e.g., non-radially stacked).

Figure 6:
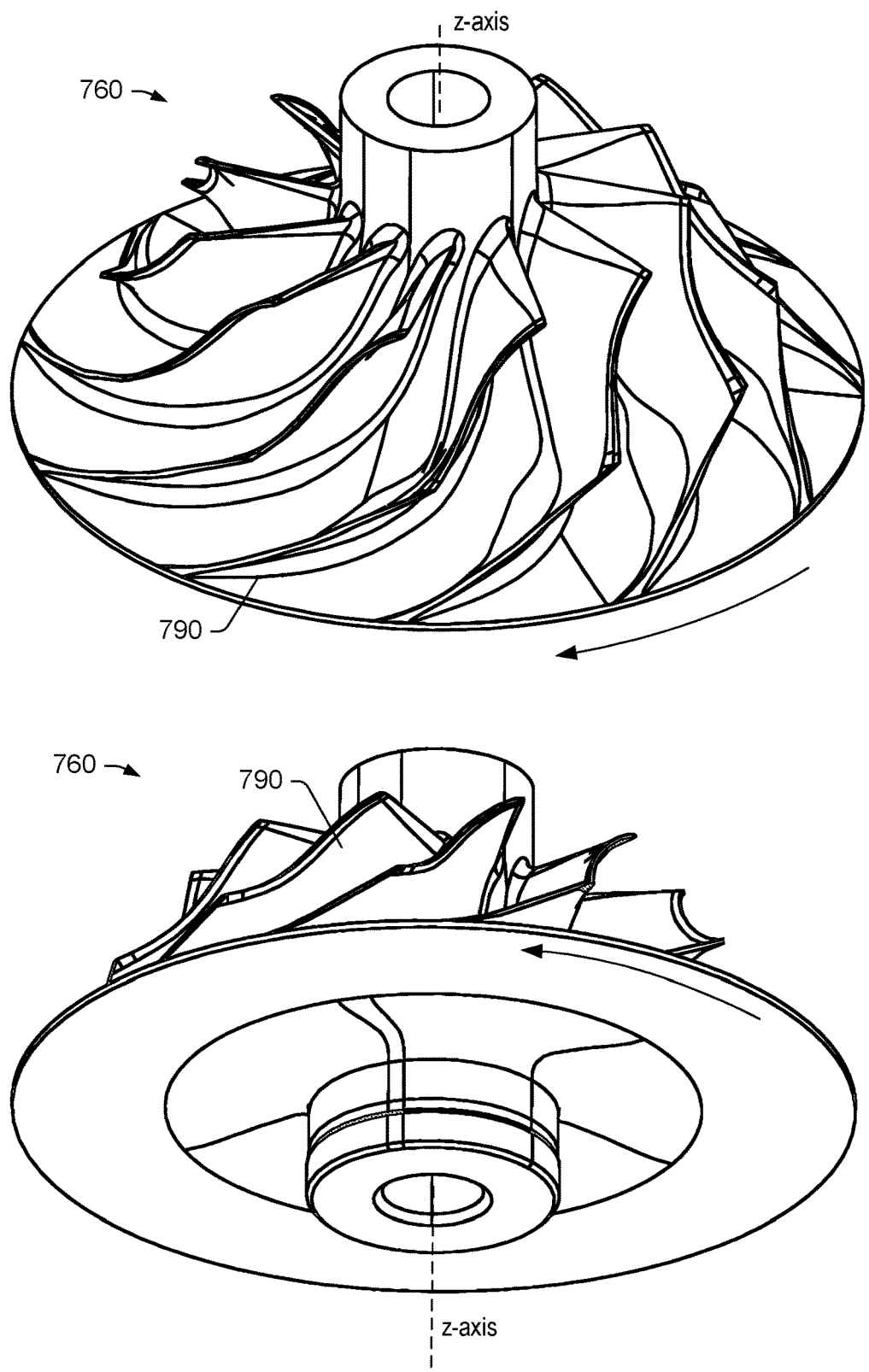
FIG. 6 is a series of perspective views of an example of a turbine wheel.

FIG. 6 shows two perspective views of an example of a turbine wheel 760 where the example turbine wheel 760 includes eleven blades, one of which is labeled as a blade 790; noting that a turbine wheel may include a number of blades, for example, in a range from approximately 5 blades to approximately 30 blades.

Figure 7:
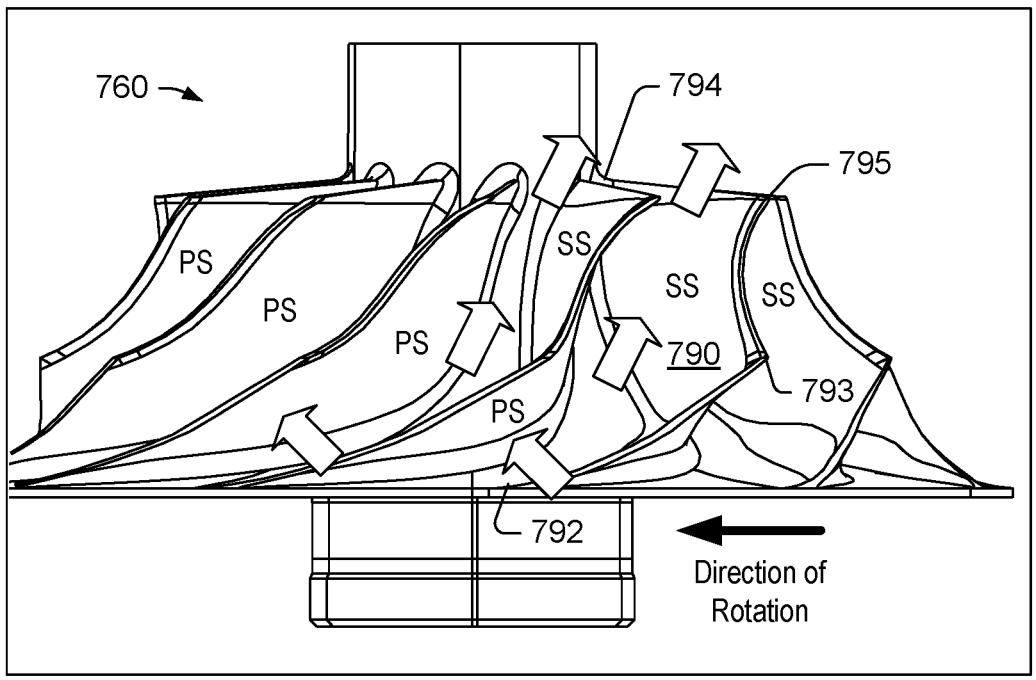
FIG. 7 is a series of views of blades of the turbine wheel of FIG. 7.
Figure 7:
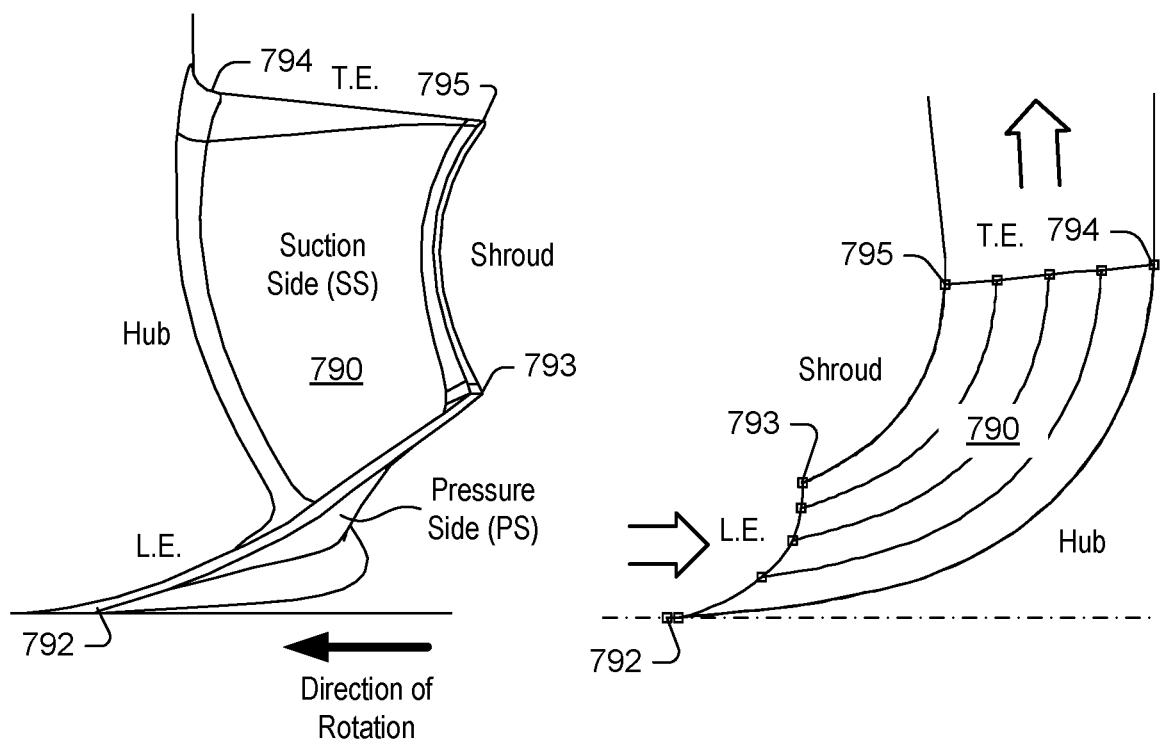

FIG. 7 shows a side view of the turbine wheel 760 along with a view of one blade such as the blade 790 and a projected view of one blade such as the blade 790, along with general directions of gas flow. In the projected view (lower right), the lines represents a meridional line and two additional lines (one to each side of the meridional line) that extend from the leading edge (L.E.) to the trailing edge (T.E.) between the hub profile and the shroud profile. As an example, one or more features of a blade may be described with respect to a meridional line, a meridional coordinate, etc. For example, consider a normalized meridional coordinate system that is zero at the leading edge and unity (one) at the trailing edge. In FIG. 7, the various points 792, 793, 794 and 795 may be understood with reference to the points 492, 493, 494 and 495 of FIGS. 4 and 5. Various other features described with respect to FIGS. 3, 4, 5 and 6 may be utilized to describe various features of the turbine wheel 760 of FIG. 7. The turbine wheel 760 of FIG. 7 and/or blades thereof can be suitable for use in a fuel cell associated charging unit such as, for example, the charging device 102 of FIG. 1, the charging device 202 of FIG. 2 and/or another type of charging device (e.g., with one or more compressor wheels). For example, the turbine wheel 760 of FIG. 7 and/or blades thereof can be suitable for use in a fuel cell system such as, for example, the fuel cell system 100 of FIG. 1.

In the example of FIG. 7, the blade 790 may be defined in part with respect to a rake angle, which can be defined using a backdisk plane where the rotational axis of the turbine wheel 760 is normal to the backdisk plane. For example, a rake angle may be defined via the points 792 and 793 on the leading edge of the blade 790 (e.g., and points between the points 792 and 793).

As an example, a turbine wheel can include features such as a special non-radial element and theta distribution. Such features can provide for a substantial increase in performance (e.g., an increase in efficiency). As explained, turbine wheels can be expected to operate at high rotational speeds that can be in excess of 100,000 rpm, 200,000 rpm or more. Under such conditions, mechanical properties of a turbine wheel are expected to be acceptable (e.g., low cycle fatigue (LCF) and high cycle fatigue (HCF)), particularly where a non-radial element(s) exists.

As an example, an electric compressor or "e-compressor" can include a turbine where the turbine includes a turbine wheel with features that improve utilization of the electric compressor for fuel cell applications (see, e.g., FIG. 1 and FIG. 2). As an example, an e-compressor can be utilized for hydrogen-powered passenger vehicles and commercial vehicles to supply air flow into a fuel cell stack. As an example, a modular fuel cell e-compressor can include a turbine and can operate at rotational speed in excess of 100,000 rpm (e.g., up to 150,000 rpm or more). As explained, a turbine can be a turbine expander, which may operate to provide a substantial reduction in electrical power consumption (e.g., consider 5 percent or more) when compared to a comparable non-turbine expander e-compressor. Use of a turbine expander can reduce hydrogen consumption, for example, to increase range of a fuel cell powered vehicle.

Figure 8:
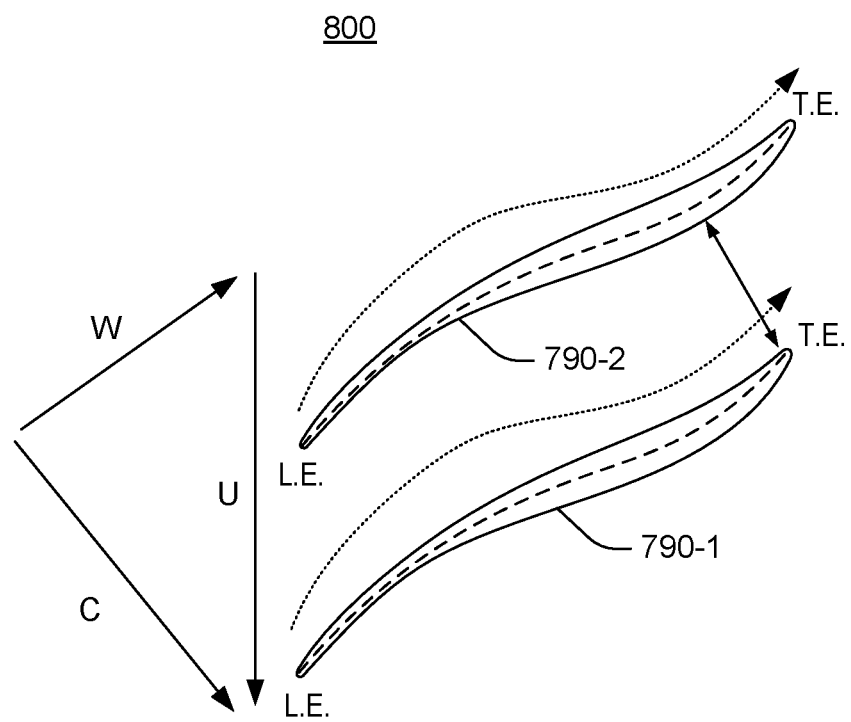
FIG. 8 is an example of a plot of a velocity triangle with respect to two blades.

FIG. 8 shows an example of a diagram of velocity components 800 with respect to adjacent instances of the blade 790 of the turbine wheel 760 of FIG. 7, labeled as blades 790-1 and 790-2 that define a flow channel therebetween. In the diagram 800, vectors are shown that define a velocity triangle where a U vector is the blade speed (e.g., a blade tip velocity), a W vector is the velocity in the rotating, relative frame, and a C vector is the velocity in the stationary frame. In the example diagram 800, each of the blades 790-1 and 790-2 can be seen to include an S-shape that can be tailored for use in fuel cell applications (e.g., operational conditions of fuel cell applications). As shown via the velocity triangle, a turbine wheel that includes such S-shaped blades can provide for a high U (rotational speed) that will lead to a W (relative velocity) that is in a generally reversed direction with respect to a rotational direction, which differs from a velocity triangle of a conventional internal combustion engine exhaust turbine wheel. In the example diagram 800, the direction of rotation is generally in the direction of the U vector (see the turbine wheel 760 of FIG. 7). In the example diagram 800, dotted arrows indicate a general path of flow from the leading edge to the trailing edge of channels defined by adjacent instances of the blade 790. Also shown in FIG. 8 is a double-headed arrow that indicates a spacing between the blades 790-1 and 790-2 (e.g., a flow channel width dimension).

As an example, an S-shape turbine blade can be beneficial for fuel cell related applications as dependent on fuel cell system operational conditions, which include relatively high motor speed and relatively low temperature gas. An S-shaped turbine blade can suitably fit a fuel cell inlet flow direction and improve performance. As shown in the example of FIG. 8, an S-shape can be defined from a leading edge to a trailing edge of a blade. Such a shape can be defined via derivatives, for example, first and second derivatives, which may define minimum, maxima, inflection points, etc. As an example, an S-shaped blade may be defined with respect to convexity and/or concavity. For example, in FIG. 8, in going from a leading edge to a trailing edge, an S-shaped blade may be defined as being convex and then concave (e.g., with respect to a direction of flow and/or intended rotation).

For fuel cell applications, a relatively larger turbine wheel diameter can facilitate balancing for compressor side thrust loading; however, turbine speed and ER requirements can lead to high U/C operation points (e.g., greater than 1). For improving high U/C operational performance, as an example, the blade 790 may include a concave turbine wheel leading edge where the leading edge at the hub (e.g., along a hub profile) has a radius that is greater than a radius of the leading edge at the shroud (e.g., along a shroud profile). Such a blade can include an S-shaped blade surface (e.g., as defined by theta angle) and can include a convex blade beta angle distribution. As an example, a leading edge may be concave, straight or convex or may have portions that are concave, straight and/or convex.

Figure 9:
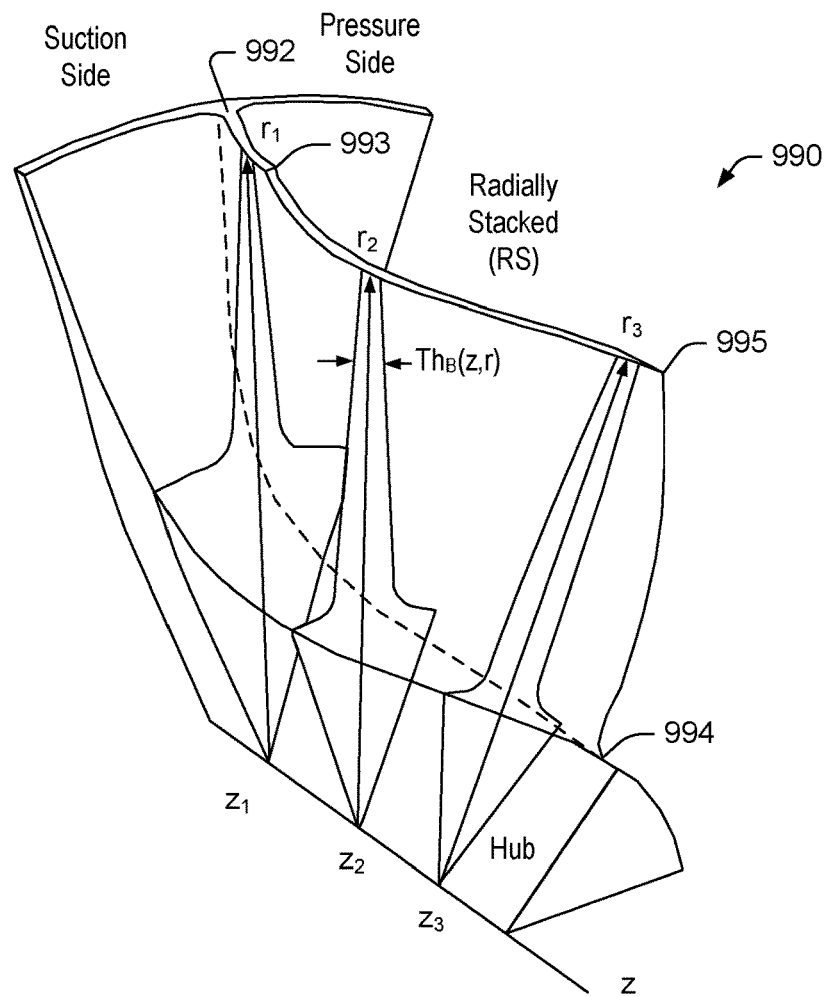
FIG. 9 is a series of views of portions of examples of turbine wheels.
Figure 9:
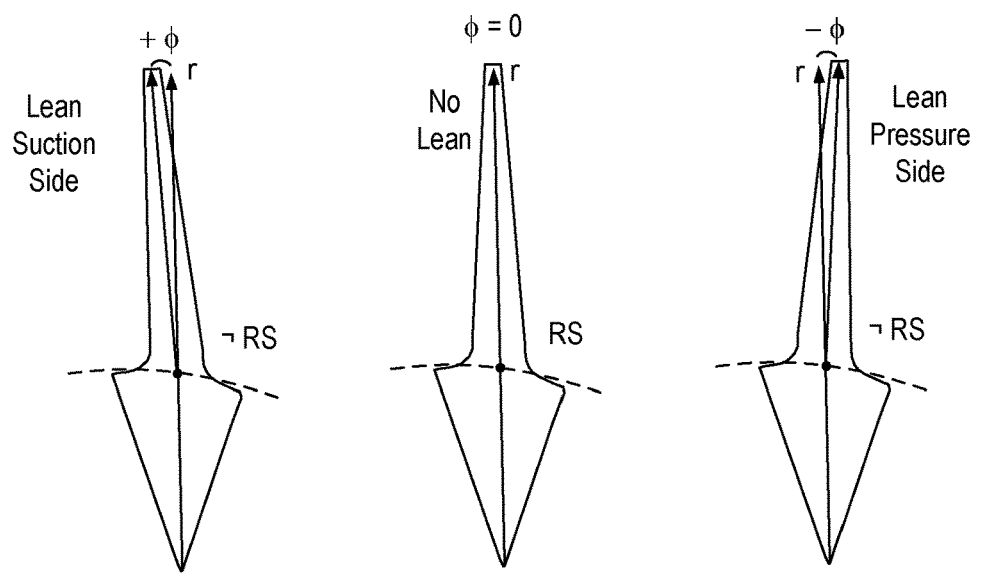

FIG. 9 shows an example of a blade 990 as a section of a turbine wheel that includes a plurality of blades. As shown, the blade 990 includes various points 992, 993, 994 and 995, which may be defined in a cylindrical coordinate system. In the example blade 990 of FIG. 9, three radial lines are shown, labeled $r_1$, $r_2$ and $r_3$, which have corresponding axial coordinates $z_1$, $z_2$ and $z_3$, where each of the three radial lines may be referred to as a radial fiber. In FIG. 9, at three different r, Θ planes at $z_1$, $z_2$ and $z_3$, cross-sectional areas and shapes of the hub and the blade 990 are illustrated. As an example, a blade can be defined in part by a thickness, which can be shown as the thickness $Th_B(z,r)$ at a particular axial dimension and a particular radial dimension. A blade thickness can be a distance that is between a pressure surface (e.g., a pressure side) and a suction surface (e.g., a suction side) of a blade. In the example of FIG. 9, the blade 990 can have a thickness that various in different regions. As an example, a blade may be thinner at a shroud edge (e.g., along a shroud profile) and thicker at a hub edge (e.g., along a hub profile). As shown in FIG. 9, the hub can vary in its radius where the hub can have a smaller radius near a nose and a larger radius near a base (e.g., where the blade 990 joins the backdisk).

As shown, the blade 990 is radially stacked (RS) because a radial line can be drawn from the hub to the leading edge at $z_1$, $r_1$, from the hub to the shroud edge at $z_2$, $r_2$, and from the hub to the shroud edge at $z_3$, $r_3$. In FIG. 9, the radial lines have their origin along the z-axis, which is the rotational axis of a turbine wheel that includes the blade 990. Radial stacking can be beneficial with respect to stresses of a turbine wheel as radial stacking helps to reduce excessive blade stresses at high rotational speeds (e.g., rotational speeds in excess of 10,000 rpm, 100,000 rpm, etc.).

In FIG. 9, the radial lines of the blade 990 are also mean lines in that each of the radial lines is centered between the suction side (SS) and the pressure side (PS) of the blade 990. Another type of line that can be utilized to describe a blade is the camber line (or camberline), which is a mean line of a blade profile that extends from the leading edge to the trailing edge, halfway between the pressure side (pressure surface) and the suction side (suction surface). In the example blade 990 of FIG. 9, a camber line or camber lines can form a camber sheet or camber surface that extends from the leading edge to the trailing edge of the blade 990 where at each axial position, a radial line extends from the hub profile to the shroud profile of the camber surface. For example, the portions of the radial lines $r_1$, $r_2$ and $r_3$ between the hub profile and the leading edge, the shroud edge and the trailing edge are all in the camber surface for the blade 990. For a given blade, where a radial line at an axial position, between the hub profile and the leading edge, the shroud profile or the trailing edge, does not coincide with the camber surface, that blade is not radially stacked.

FIG. 9 also shows two examples of non-radially stacked (¬ RS) blades, which can be defined by a lean angle. As shown, a lean angle can be defined with respect to a radial line where the lean angle can be toward a suction side or toward a pressure side. As an example, a lean angle can be defined to be positive when it is toward a suction side and negative when it is toward a pressure side. As shown, for a radially stacked blade, the lean angle is zero. As an example, a blade may be non-radially stacked and include a lean angle that is in some regions negative and in some regions positive.

Figure 10:
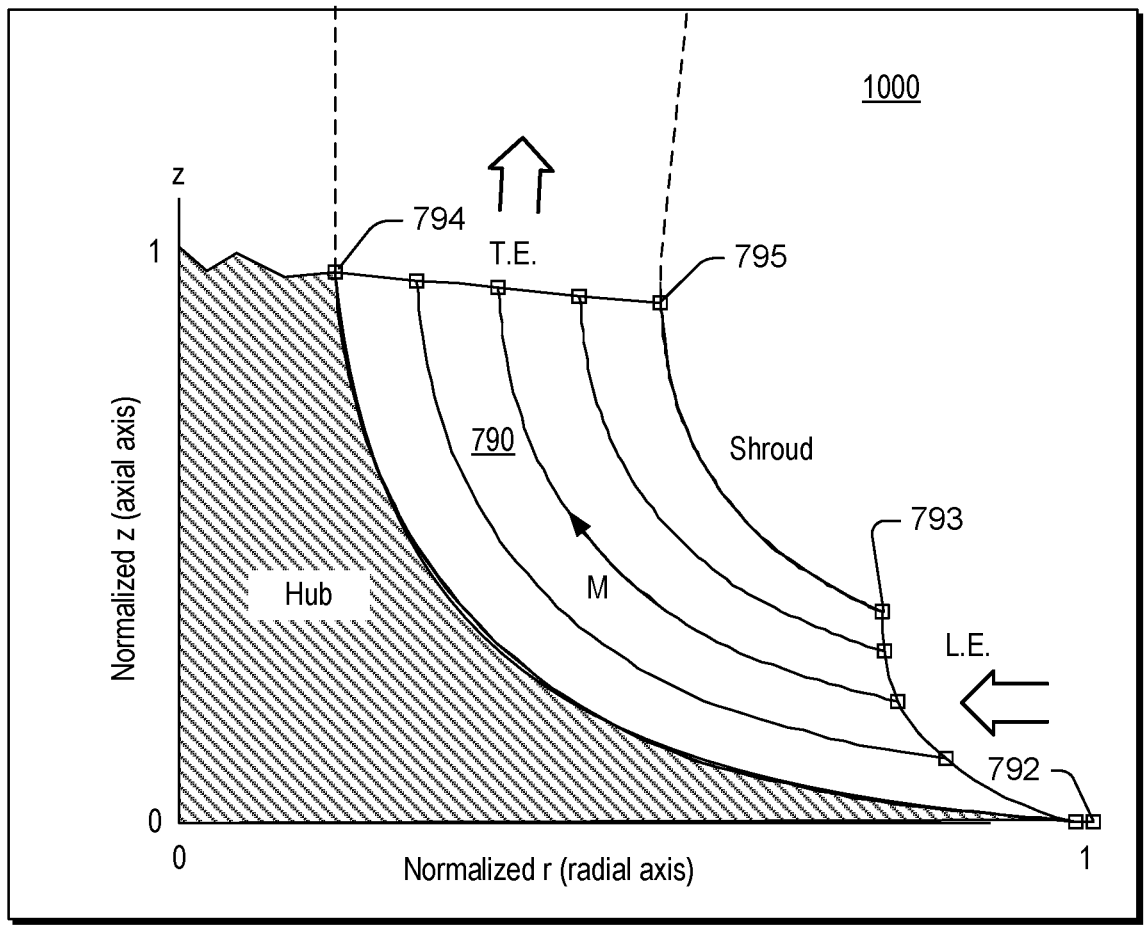
FIG. 10 is an example of a plot of a turbine wheel blade.
Figure 10:
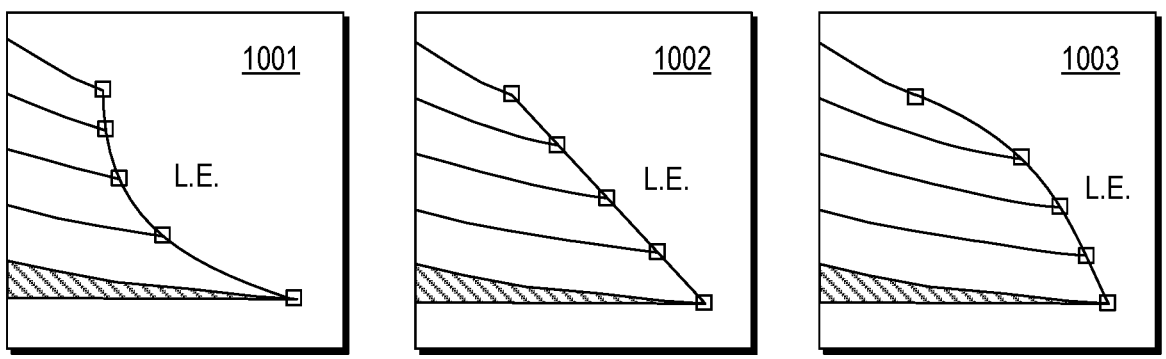

FIG. 10 shows an example plot 1000 that correspond to the example blade 790. The plot 1000 shows a meridional line (M) along a normalized plane of the axial axis and the radial axis of a projection of the blade 790 where the hub profile and shroud profile are shown along with the leading edge (L.E.) and the trailing edge (T.E.). As shown, the shroud profile can be represented by a shroud edge (S.E.). As explained, a leading edge (L.E.) can be concave, straight or convex or a mix thereof. In FIG. 10, example plots 1001, 1002 and 1003 show examples of concave, straight and convex leading edges, respectively (e.g., in a projected view).

Figure 11:
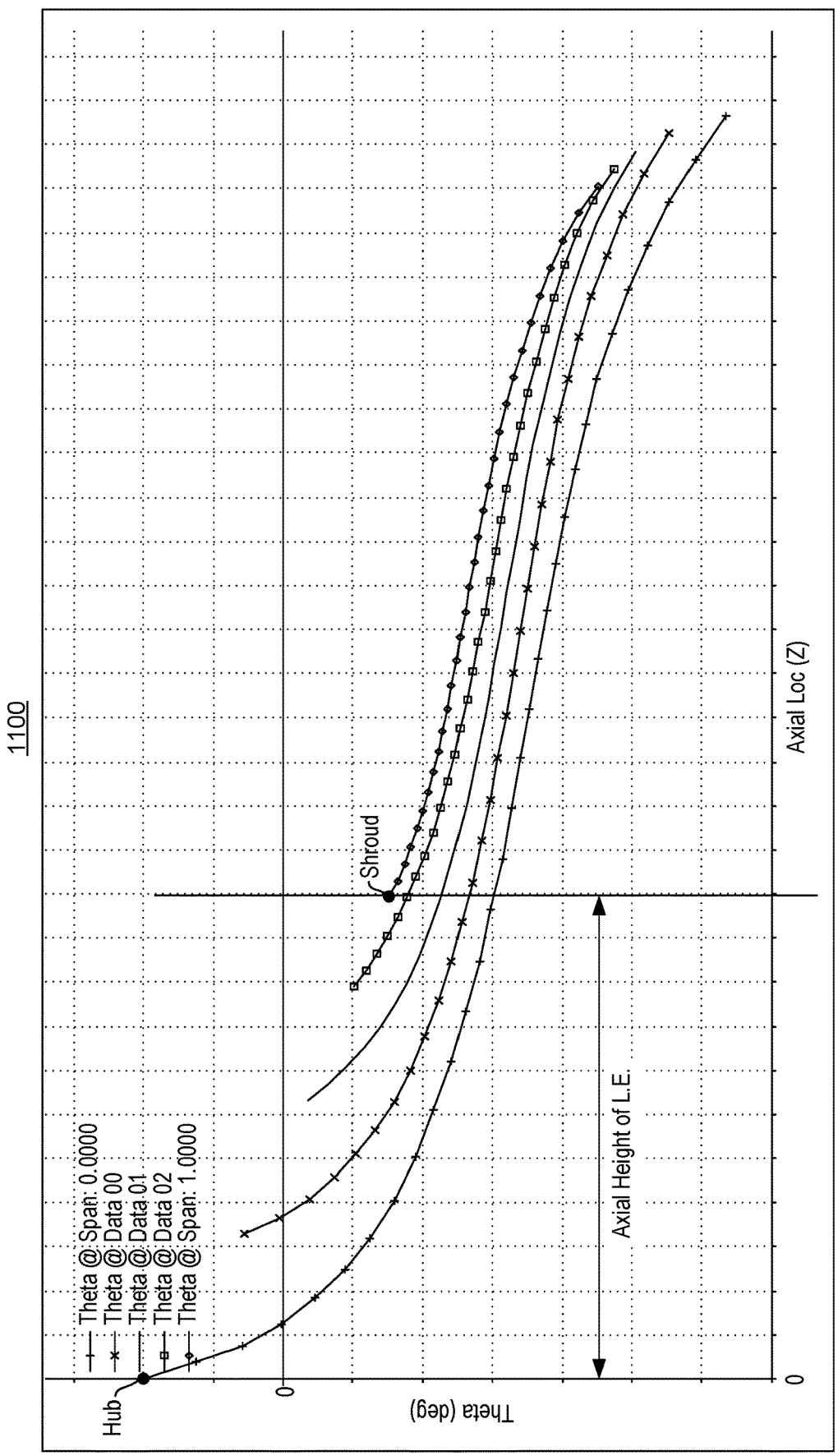
FIG. 11 is an example of a plot of theta angle versus axial location for an example of a turbine wheel blade.

FIG. 11 shows an example plot 1100 that include positional data for the hub profile and the shroud profile with respect to theta and z axial axis coordinate (Z) positions for a turbine wheel in height from the point 792 at the hub to the point 794 at the hub where height is measured with respect to the z axial axis coordinate (e.g., the rotational axis of the turbine wheel). As shown, in the plot 1100, the axial height of the leading edge (L.E.) can be defined. As an example, a blade according to the plot 1100 can provide for reduced secondary flow loss. For example, a turbine wheel such as the turbine wheel 760 can include a series of blades such as the blade 790 that conform to one or more of the shapes indicated in the example plot 1100 of FIG. 11 such that during operation in a fuel cell application charging unit, the turbine wheel 760 provides for reducing secondary flow losses. As mentioned, a blade can include an S-shaped blade surface (e.g., as defined by theta angle) and can include a convex blade beta angle distribution.

As an example, a leading edge can span a theta angle from approximately 20 degrees to approximately −30 degrees at the hub (e.g., along the hub profile). Thereafter, moving higher in axial height, the hub profile can range from approximately −30 degrees to approximately −65 degrees. As such, an entire range of theta angle can be from approximately 20 degrees to approximately −65 degrees, for a total of 85 degrees, which is approximately 25 percent of 360 degrees. As an example, a blade can have a hub profile that spans a range of theta angles that is greater than approximately 50 degrees, 60 degrees, 70 degrees or 80 degrees. As explained, such a blade can include an S-shape. As explained, such a blade can include a majority of a total range of theta angles that is over a height of a leading edge of the blade. As explained, 50 degrees of 85 degrees can be over a height of a leading edge of a blade (e.g., consider the blade 790). As an example, a blade can include 50 percent or more of its total theta angle range over the height of the leading edge of the blade where the total theta angle range is greater than approximately 50 degrees, 60 degrees, 70 degrees or 80 degrees.

Figure 12:
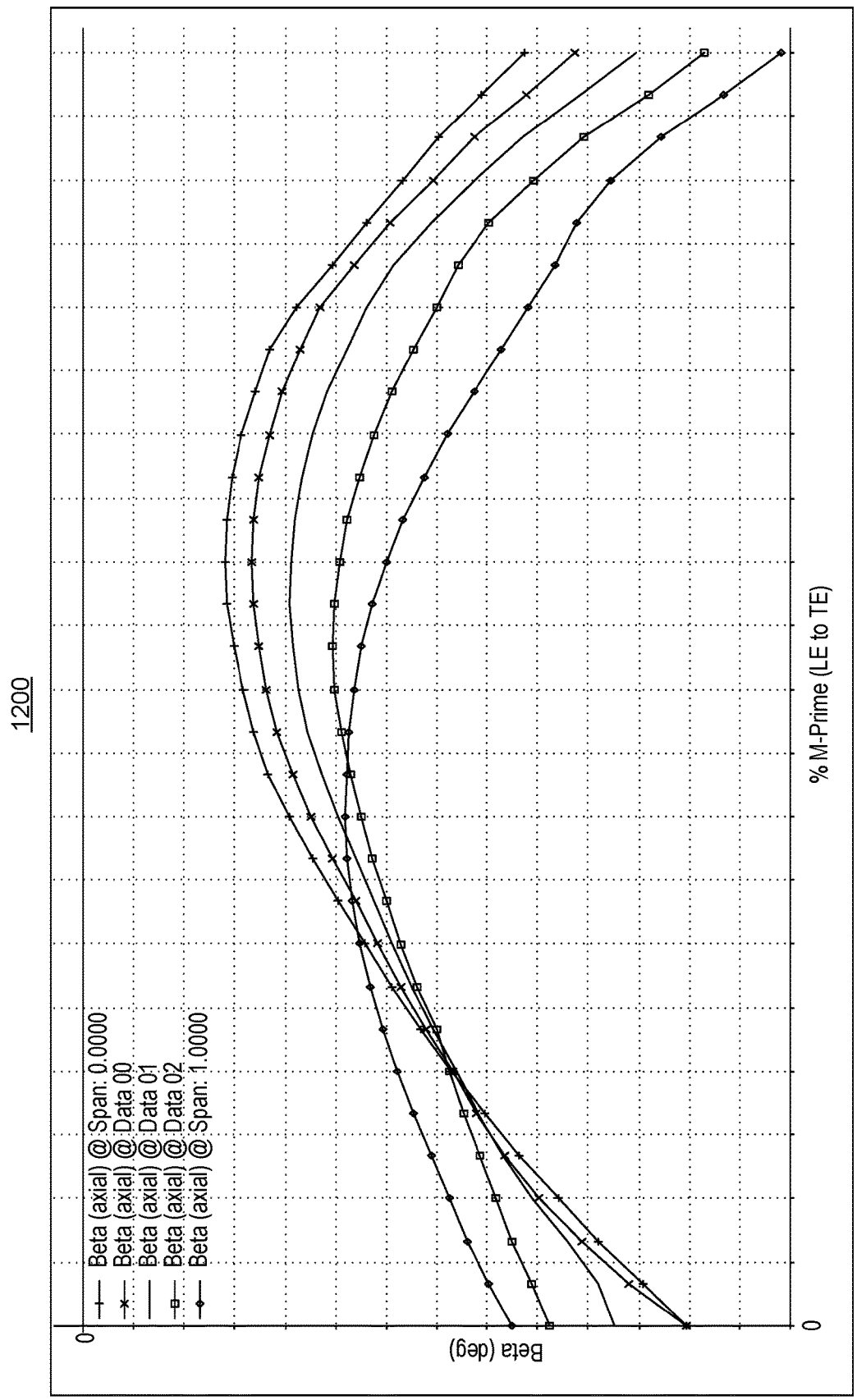
FIG. 12 is an example of a plot of beta angle versus a percentage of a coordinate along an example of a turbine wheel blade.

FIG. 12 shows an example plot 1200 of beta angle with respect to percentage of M-prime from leading edge to trailing edge, ranging from 0 to 100 percent. As to beta angle, it can be defined using the position along a construction line that may be described by a meridional coordinate xm such that the curvature of a camber line can be defined by a local blade angle, beta angle (β), which may be represented by the following equation: $\tan(\beta) = r\, d\Theta/dxm$. As such, the blade angle (beta angle, β) can be related to the theta angle (Θ) (see, e.g., the the plot 1100 of FIG. 11).

As an example, the beta angle can include a maximum that is greater than approximately −35 degrees, while a minimum may be less than −60 degrees. As mentioned, a blade can include a convex blade beta angle distribution.

In the example plot 1200 of FIG. 12, such design features can be for an S-shape where the S-shape exists for both the pressure side surface of each blade and the suction side surface of each blade. For example, a thickness of a blade may be defined between two S-shaped surfaces (e.g., a pressure side surface and a suction side surface).

Figure 13:
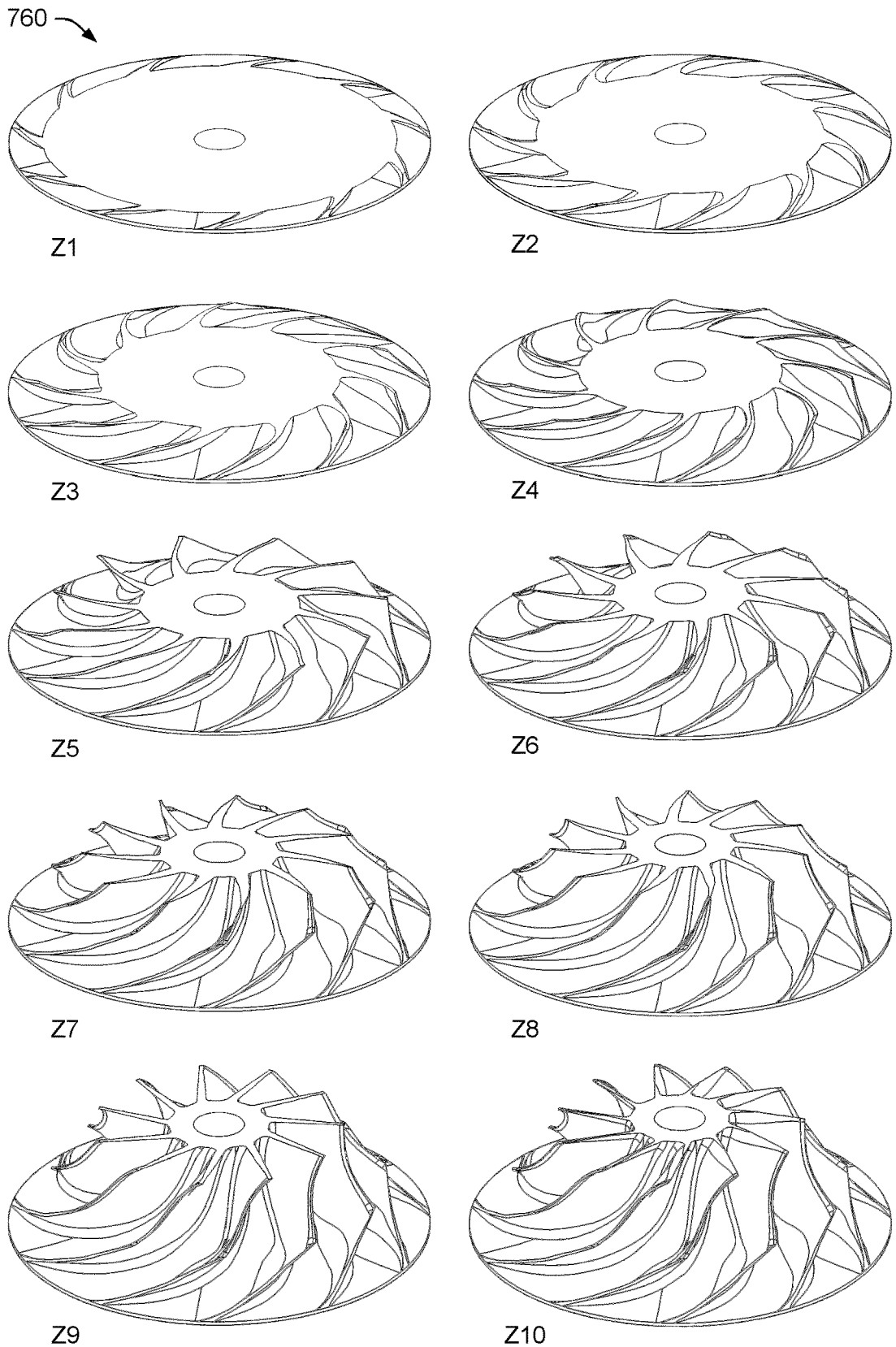
FIG. 13 is a series of cross-sectional, cutaway views of the turbine wheel of FIG. 7.

FIG. 13 shows the turbine wheel 760 in a series of cross-sectional, cutaway views at different axial positions along a z-axis (Z1, Z2, Z3, Z4, Z5, Z6, Z7, Z8, Z9 and Z10), which is the rotational axis of the turbine wheel 760. In each of the views, a radial line can be drawn to determine whether a blade is radially stacked, not radially stacked, leaning or not leaning where leaning can be defined by one or more lean angles that include at least one non-zero lean angle at at least one radial position.

As shown, the axial position Z1 is closer to the backdisk while the axial position Z10 is closer to the nose. In each of the cutaway views, blade thicknesses can be seen, which can vary with respect to axial and radial dimensions. In each of the cutaway views, a flat, planar surface is visible that is formed by a portion of the hub and a portion of the blades. As mentioned, the hub can be represented in part by a radius (e.g., or a diameter), where the radius may decrease in a direction from the backdisk to the nose (e.g., from Z1 to Z10). In the various cutaway views, the blades can appear to be increasing in length from the hub (e.g., as the hub radius becomes smaller); noting that a transition may occur at the end of the leading edge (e.g., tip of a leading edge), which meets the shroud edge. As an example, for a mixed-flow turbine wheel, a leading edge of a blade may extend beyond a backdisk such that at least a portion of a leading edge can have a radius that is greater than a backdisk radius.

Figure 14:
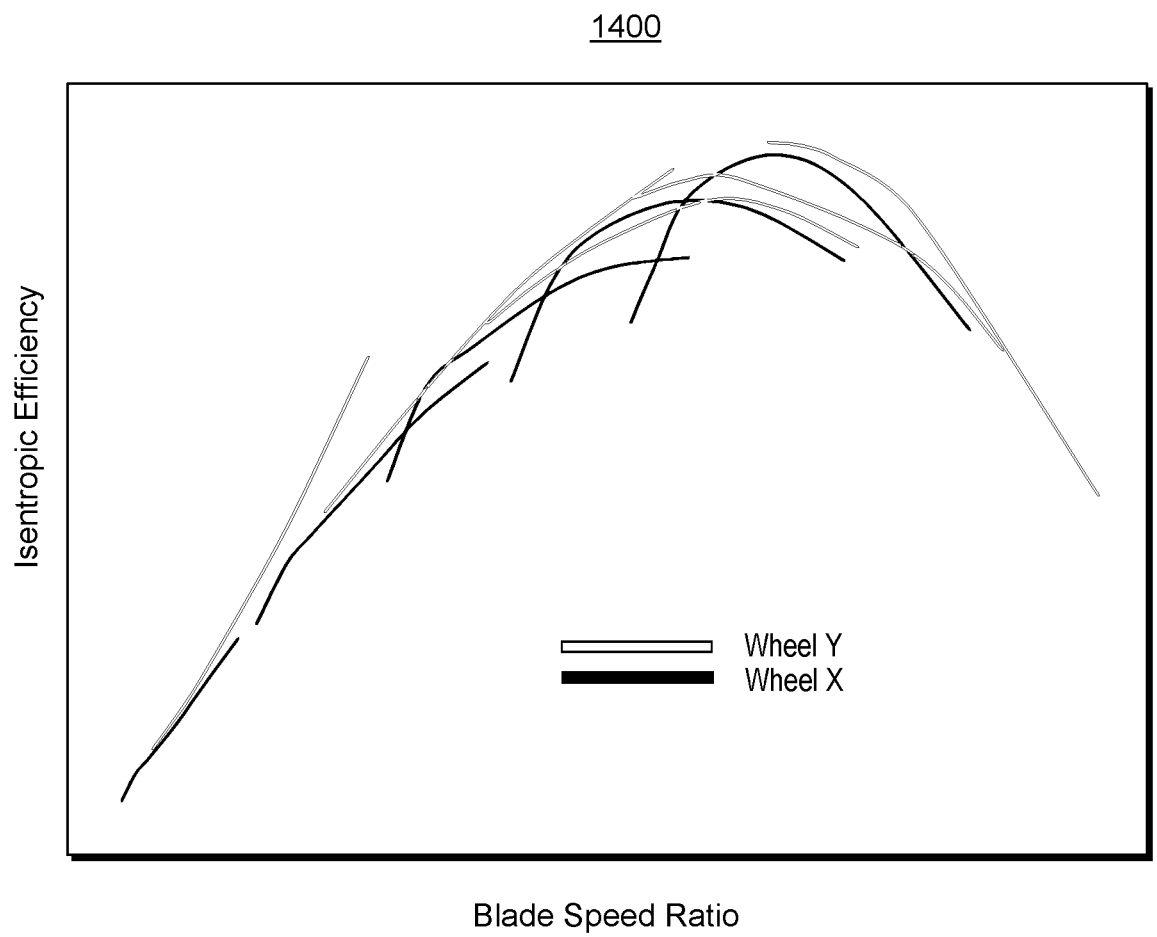
FIG. 14 is an example of a plot of isentropic efficiency versus blade speed ratio.

FIG. 14 shows an example plot 1400 of isentropic efficiency versus blade speed ratio, U/C, for a turbine wheel X and a turbine wheel Y where the peak efficiency is within a U/C range of approximately 0.9 to approximately 1. As explained, a charging unit for a fuel cell application can benefit from higher turbine diameter for balancing compressor wheel side thrust loading; but turbine speed and efficiency ratio (ER) requirements can lead to high U/C operational points (e.g., greater than 1). Hence, for improving high U/C operational performance, a turbine wheel can include blades where each blade includes a concave turbine wheel leading edge where hub radius is greater than shroud radius; an S-shaped blade surface (see, e.g., theta angle of the plot 1100); and a convex blade beta angle distribution (see, e.g., beta angle of the plot 1200). As explained, a leading edge of a turbine wheel blade may be concave, straight and/or convex where the turbine wheel blade includes an S-shaped blade surface (see, e.g., theta angle of the plot 1100) and a convex blade beta angle distribution (see, e.g., beta angle of the plot 1200). In the example plot 1400 of FIG. 14, the isentropic efficiency versus blade speed ratio is generally greater for the turbine wheel Y than the turbine wheel X where the turbine wheel Y can include features such as, for example, blades that have an S-shape (e.g., an S-shaped suction side surface and an S-shaped pressure side surface).

As an example, a turbine wheel can include a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a leading edge and a trailing edge, where the leading edge includes a lower axial point defined by a first theta angle and an upper axial point defined by a second theta angle, where the first theta angle is greater than the second theta angle with respect to the direction of intended rotation of the turbine wheel. In such an example, each of the blades can include an S-shape.

As an example, a leading edge of a blade can include a lower axial point defined by a first theta angle and an upper axial point defined by a second theta angle, where the first theta angle is greater than the second theta angle with respect to the direction of intended rotation of the turbine wheel; and a trailing edge of the blade can include a lower axial point defined by a third theta angle and an upper axial point defined by a fourth theta angle, where the second theta angle is greater than the third theta angle and the fourth theta angle. In such an example, the blade can be S-shaped.

As an example, a turbine wheel can include blades where each of the blades includes a hub profile and a shroud profile, where, along the hub profile, a range of theta angles is greater than 50 degrees. In such an example, at least 50 percent of the range of theta angles can be between a first theta angle at lower axial point of a leading edge and a hub profile theta angle along the hub profile at an axial height that corresponds to an upper axial point of the leading edge.

As an example, a turbine wheel can include blades where each of the blades includes a hub profile and a shroud profile, where, along the hub profile, a range of theta angles is greater than 50 degrees, for example, consider the at least 50 percent of the range of theta angles to be at least 25 degrees.

As an example, a turbine wheel can include blades where a leading edge of each of the blades is concave. As an example, a turbine wheel can include blades where a leading edge of each of the blades is straight. As an example, a turbine wheel can include blades where a leading edge of each of the blades is convex. As an example, a turbine wheel can include blades where a leading edge of each of the blades includes one or more of a concave portion, a straight portion and a convex portion. As an example, a turbine wheel can include blades where a leading edge of each of the blades includes one or more of a straight portion and a convex portion.

As an example, a radius of a leading edge of a blade of a turbine wheel, at a lower axial point, can be greater than a radius of the leading edge at an upper axial point. In such an example, the blade can be S-shaped. As an example, a turbine wheel can include a plurality of such blades where each of the blades includes an S-shaped blade surface or S-shaped blades surfaces. For example, a blade can include an S-shaped pressure side (PS) surface and an S-shaped suction side (SS) surface. As an example, each of such blades can include a convex beta angle distribution.

As an example, a turbine wheel can include a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a leading edge and a trailing edge, where the leading edge includes a lower axial point defined by a first theta angle and an upper axial point defined by a second theta angle, where the first theta angle is greater than the second theta angle with respect to the direction of intended rotation of the turbine wheel. In such an example, each of the blades can include an S-shape where the turbine wheel is a turbine-expander turbine wheel of an electrical compressor assembly. In such an example, the electrical compressor assembly can be a charging device for a fuel cell system.

As an example, an assembly can include a shaft; an electric motor rotor mounted to the shaft; a compressor wheel mounted to the shaft; and a turbine wheel mounted to the shaft, where the turbine wheel includes: a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a leading edge and a trailing edge, where the leading edge includes a lower axial point defined by a first theta angle and an upper axial point defined by a second theta angle, where the first theta angle is greater than the second theta angle with respect to an intended direction of rotation of the turbine wheel. In such an example, each of the blades can include an S-shape. In such an example, the turbine wheel can be a turbine-expander turbine wheel where the assembly can be suitable for use as a charging device for a fuel cell system.

As an example, an assembly can include a fuel cell unit, an inlet conduit from a compressor wheel to the fuel cell unit and an outlet conduit from the fuel cell unit to a turbine wheel where the turbine wheel can include S-shaped blades. As an example, a turbine wheel can operate as a turbine expander to assist rotation of an electric motor rotor where the turbine wheel and the electric motor rotor are mounted to and/or part of a rotatable shaft. In such an example, the electric motor rotor can be part of an electric motor that includes a stator where the electric motor rotor and the stator provide for generation of force (e.g., electromagnetic force) to cause the electric motor rotor to rotate and thereby rotate the rotatable shaft to drive at least one compressor wheel. In such an example, the turbine expander can provide additional force via flow of gas that causes rotation of the turbine wheel to assist the electric motor in its effort to rotate the rotatable shaft. As explained, S-shaped turbine wheel blades can beneficially improve operation of a turbine expander as may be utilized in a charging device for a fuel cell system.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine wheel comprising:
    a hub that comprises a rotational axis, a backdisk and a nose, wherein the rotational axis defines an axial coordinate (z) in a cylindrical coordinate system that comprises a radial coordinate (r) and an azimuthal coordinate (Θ) in a direction of intended rotation about the rotational axis; and
    blades that extend outwardly from the hub, wherein each of the blades comprises a leading edge and a trailing edge, wherein the leading edge comprises a lower axial point defined by a first theta angle and an upper axial point defined by a second theta angle, wherein the first theta angle is greater than the second theta angle with respect to the direction of intended rotation of the turbine wheel.

2. The turbine wheel of claim 1, wherein each of the blades comprises an S-shape.

3. The turbine wheel of claim 1, wherein the trailing edge comprises a lower axial point defined by a third theta angle and an upper axial point defined by a fourth theta angle, wherein the second theta angle is greater than the third theta angle and the fourth theta angle.

4. The turbine wheel of claim 1, wherein each of the blades comprises a hub profile and a shroud profile, wherein, along the hub profile, a range of theta angles is greater than 50 degrees.

5. The turbine wheel of claim 4, wherein at least 50 percent of the range of theta angles is between the first theta angle at lower axial point of the leading edge and a hub profile theta angle along the hub profile at an axial height that corresponds to the upper axial point of the leading edge.

6. The turbine wheel of claim 4, wherein the at least 50 percent of the range of theta angles is at least 25 degrees.

7. The turbine wheel of claim 1, wherein the leading edge is concave.

8. The turbine wheel of claim 1, wherein the leading edge comprises one or more of a straight portion and a convex portion.

9. The turbine wheel of claim 1, wherein a radius of the leading edge at the lower axial point is greater than a radius of the leading edge at the upper axial point.

10. The turbine wheel of claim 9, wherein each of the blades comprises an S-shaped blade surface.

11. The turbine wheel of claim 10, wherein each of the blades comprises a convex beta angle distribution.

12. The turbine wheel of claim 1, wherein the turbine wheel is a turbine-expander turbine wheel of an electrical compressor assembly.

13. An assembly comprising:
    a shaft;
    an electric motor rotor mounted to the shaft;
    a compressor wheel mounted to the shaft; and
    a turbine wheel mounted to the shaft, wherein the turbine wheel comprises
        a hub that comprises a rotational axis, a backdisk and a nose, wherein the rotational axis defines an axial coordinate (z) in a cylindrical coordinate system that comprises a radial coordinate (r) and an azimuthal coordinate (Θ) in a direction of intended rotation about the rotational axis; and
        blades that extend outwardly from the hub, wherein each of the blades comprises a leading edge and a trailing edge, wherein the leading edge comprises a lower axial point defined by a first theta angle and an upper axial point defined by a second theta angle, wherein the first theta angle is greater than the second theta angle with respect to an intended direction of rotation of the turbine wheel.

14. The assembly of claim 13, comprising a fuel cell unit, an inlet conduit from the compressor wheel to the fuel cell unit and an outlet conduit from the fuel cell unit to the turbine wheel.

15. The assembly of claim 13, wherein the turbine wheel operates as a turbine expander to assist rotation of the electric motor rotor.

* * * * *